(12) United States Patent
Nagy et al.

(10) Patent No.: US 7,655,740 B2
(45) Date of Patent: *Feb. 2, 2010

(54) OLEFIN POLYMERIZATION PROCESS

(75) Inventors: Sandor Nagy, Naperville, IL (US); Barbara M. Tsuie, Cincinnati, OH (US); Jean A. Merrick-Mack, West Chester, OH (US); Natalia Nagy, Naperville, IL (US)

(73) Assignee: Equistar Chemicals, LP, Houston, TX (US)

( * ) Notice: Subject to any disclaimer, the term of this patent is extended or adjusted under 35 U.S.C. 154(b) by 258 days.

This patent is subject to a terminal disclaimer.

(21) Appl. No.: 11/899,092

(22) Filed: Sep. 4, 2007

(65) Prior Publication Data

US 2009/0062488 A1 Mar. 5, 2009

(51) Int. Cl.
*C08F 4/64* (2006.01)
*C08F 4/76* (2006.01)
*C08F 4/52* (2006.01)

(52) U.S. Cl. .................. 526/172; 526/161; 526/348; 526/348.5; 526/348.6; 526/134; 526/130; 526/126; 526/127; 526/905

(58) Field of Classification Search .............. 526/170, 526/172, 161, 160
See application file for complete search history.

(56) References Cited

U.S. PATENT DOCUMENTS

| 5,153,157 | A | 10/1992 | Hlatky et al. |
|---|---|---|---|
| 5,198,401 | A | 3/1993 | Turner et al. |
| 5,241,025 | A | 8/1993 | Hlatky et al. |
| 5,414,180 | A | 5/1995 | Geerts et al. |
| 5,648,440 | A | 7/1997 | Sugano et al. |
| 6,211,311 | B1 | 4/2001 | Wang et al. |
| 6,232,260 | B1 | 5/2001 | Nagy et al. |
| 6,451,724 | B1 | 9/2002 | Nifant'ev et al. |
| 6,559,251 | B1 | 5/2003 | Mack et al. |
| 6,838,410 | B2 * | 1/2005 | Wang et al. .......... 502/103 |
| 6,908,972 | B2 * | 6/2005 | Tsuie et al. .......... 526/160 |
| 7,196,147 | B2 | 3/2007 | Wang et al. |
| 2007/0293639 | A1 * | 12/2007 | Nagy et al. .......... 526/114 |
| 2009/0061135 | A1 * | 3/2009 | Wang et al. .......... 428/36.8 |

FOREIGN PATENT DOCUMENTS

WO WO 2005/000920 1/2005
WO WO 2005/005499 1/2005

OTHER PUBLICATIONS

Stadler, et al., "Influence of Type and Content of Various Comonomers on Long-Chain Branching of Ethene/α-Olefin Copolymers", *Macromolecules 39* (2006) 1474-1482.

* cited by examiner

*Primary Examiner*—David Wu
*Assistant Examiner*—Rip A. Lee
(74) *Attorney, Agent, or Firm*—John Tyrell; Jonathan L. Schuchardt

(57) ABSTRACT

A slurry process for polymerizing ethylene is disclosed. The process comprises polymerizing ethylene in the presence of an α-olefin and a catalyst comprising an activator and a supported bridged indeno[1,2-b]indolyl zirconium complex. The process produces polyethylene characterized by good incorporation of the α-olefin and moderate long-chain branching. The process is capable of forming high molecular weight polyethylene and has good catalyst activity.

13 Claims, No Drawings

OLEFIN POLYMERIZATION PROCESS

FIELD OF THE INVENTION

This invention relates to a slurry process for making ethylene copolymers. The process uses a highly active catalyst and provides polyethylene with good comonomer incorporation and a moderate level of long-chain branching.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. The large variety of active sites in Ziegler-Natta catalysts makes it difficult to control polymer architecture. To improve polymer properties, single-site catalysts, in particular metallocenes are beginning to replace Ziegler-Natta catalysts.

Slurry reactors are in widespread use for production of polyethylene homo- and copolymers. Slurry reactors include stirred-tank reactors and water-jacketed tubular reactors arranged in a series of continuous horizontal or vertical loops. A "slurry solvent" in which polyethylene has low solubility constitutes the continuous phase in such reactors. The slurry is intensely stirred in a continuous stirred-tank reactor or series of reactors or, in the case of slurry loop reactors, is driven around the loop at relatively high speed by one or more rather massive pumps. Ethylene, supported catalyst, comonomers, and processing additives are injected into the reactor where polymerization takes place, creating a slurry of polyethylene in solvent.

U.S. Pat. Nos. 6,232,260 and 6,451,724 disclose the use of transition metal catalysts based upon indenoindolyl ligands. Indenoindolyl catalysts are remarkably versatile because substituent effects and bridging changes can often be exploited to provide polymers with tailored physical or mechanical properties. Unbridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No 6,908,972) readily copolymerize α-olefins and provide polymers, with varying levels of long-chain branching. Some of the examples (e.g. Example 15 reports no long-chain branching and $M_w$=90,700) have very low long-chain branching (for a discussion of long-chain branching in polyethylene, see *Macromolecules* 39 (2006) 1474 and references cited therein).

Despite the considerable experience with single-site catalysts generally and indenoindolyl catalysts in particular, there is a need for improvement. One area that needs improvement is catalyst activity. While many complexes provide good activity, further improvement is desirable. Improvements in activity minimize the amount of complex needed. When a catalyst is selected to improve a certain polymer property, the activity is often sacrificed. Also important is the ability to incorporate α-olefins. Some catalysts that incorporate α-olefins well also produce polyethylene with high levels of long-chain branching. Other catalysts can produce polyethylene with little or no long-chain branching. Long-chain branching has a pronounced effect on rheology. For some applications, it is desirable to have a moderate amount of long-chain branching. A desirable process would easily incorporate α-olefins in order to control density and other properties. Also important is the ability to produce polyethylene with high molecular weight. There are different types of known polymerization processes and the choice of the process can influence the properties of the polyethylene. Ideally, the above-described benefits could be obtained in the commercially proven slurry process.

Thus, some processes incorporate α-olefins well; others provide polyolefins with moderate long-chain branching. Some processes can produce polyethylene with high molecular weight. Some processes have good activity. However, a slurry polymerization process having all four of these qualities is apparently not known and a compromise must be made. A valuable process would enable all four attributes.

SUMMARY OF THE INVENTION

The invention is a low-temperature slurry process for polymerizing ethylene in the presence of a $C_3$-$C_{10}$ α-olefin and a supported bridged indeno[1,2-b]indolyl zirconium complex. The process provides polyethylene with good incorporation of the α-olefin and a moderate level of long-chain branching, as indicated by a viscosity enhancement factor (VEF) between 2.0 and 4.0. The process is capable of forming polyethylene having a high weight-average molecular weight, as evidenced by $M_w$>250,000. The catalyst used in the inventive slurry process has an activity ratio as defined herein greater than 2.

The combination of attributes—good comonomer incorporation, high molecular weight, good activity, and moderate long-chain branching—strikes an uncommon but valuable balance, and it requires judicious selection of process conditions and the indenoindolyl zirconium complex.

DETAILED DESCRIPTION OF THE INVENTION

The invention is a slurry process for polymerizing ethylene in the presence of a $C_3$-$C_{10}$ α-olefin. Suitable $C_3$-$C_{10}$ α-olefins include, for example, propylene, 1-butene, 1-hexene, 1-octene, and mixtures thereof. Preferred $C_3$-$C_{10}$ α-olefins are 1-butene, 1-hexene, and 1-octene. The polymerization is performed at a temperature within the range of 40° C. to 90° C., more preferably from 50° C. to 85° C.

The slurry polymerization is performed in the presence of a catalyst comprising an activator and a supported complex. Complexes useful for process of the invention are dimethylsilyl-bridged indeno[1,2-b]indolyl zirconium complexes. Not all complexes of this type are suitable, however. Suitable complexes have a structure selected from the group consisting of:

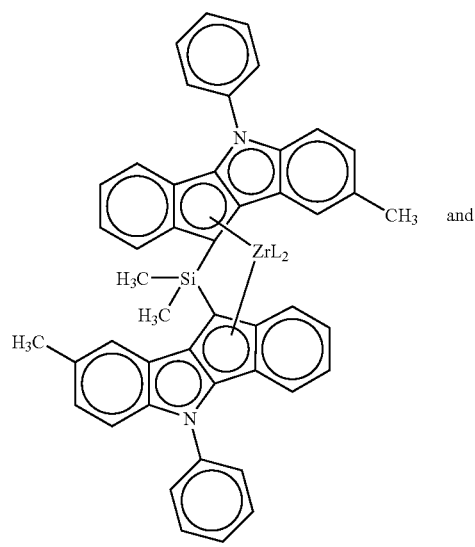

and

-continued

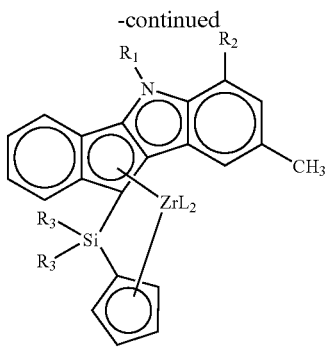

in which $R_1$ is selected from the group consisting of methyl, benzyl, and p-chlorophenyl; $R_2$ is selected from the group consisting of methyl and hydrogen; each $R_3$ is methyl or both taken together are tetramethylene and each L is independently selected from the group consisting of halide, alkoxy, aryloxy, siloxy, alkylamino, and $C_1$-$C_{30}$ hydrocarbyl.

As those skilled in the art will appreciate, the complexes shown above might be prepared as a single stereoisomer or as a mixture of stereoisomers. Throughout this patent application, a given structure is meant to encompass all possible stereoisomers of that complex, alone or in combination, and no structure is intended to be limited to any one particular stereoisomer.

Preferably each L is Cl. Preferably, the complex has a structure selected from the group consisting of:

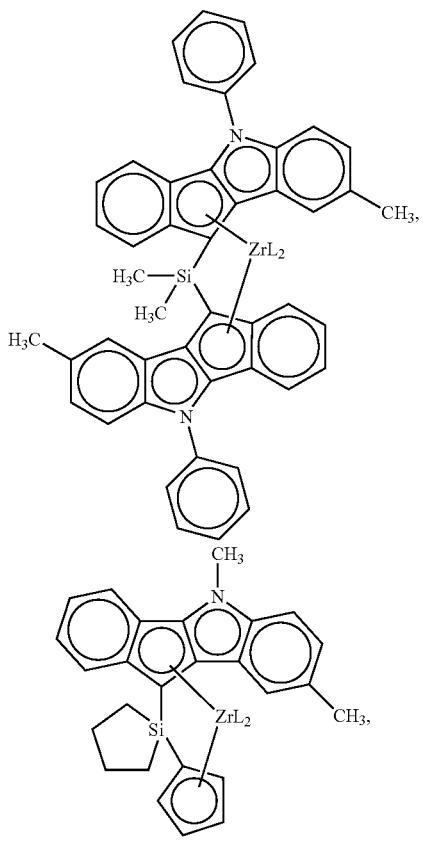

-continued

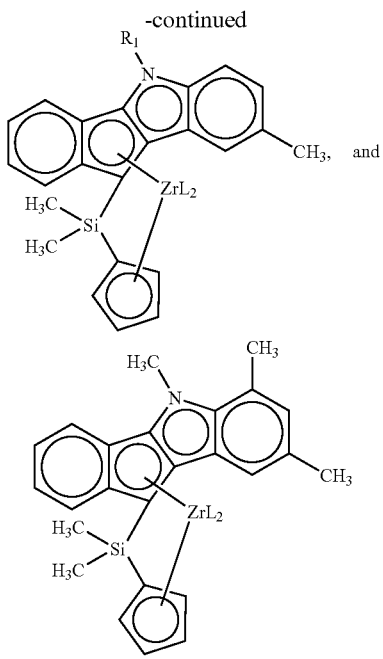

in which $R_1$ is selected from the group consisting of methyl, benzyl, and p-chlorophenyl; and each L is independently selected from the group consisting of halide, alkoxy, aryloxy, siloxy, alkylamino, and $C_1$-$C_{30}$ hydrocarbyl.

Indeno[1,2-b]indolyl ligands are conveniently generated by deprotonating an indeno[1,2-b]indole compound using a potent base. Suitable indeno[1,2-b]indolyl ligands and ways to name, synthesize, and incorporate them into a dimethylsilyl-bridged zirconium complex have been described in considerable detail elsewhere; see, for example, U.S. Pat. Nos. 6,232,260, 6,908,972 and 6,559,251, the teachings of which are incorporated herein by reference, and the references cited therein.

Example 1 of U.S. Pat. No. 6,908,972 illustrates a particularly useful way to prepare complexes suitable for use in the inventive process. Usually, the indeno[1,2-b]indole precursor having the desired substituents is prepared by reacting the appropriate 1-indanone and arylhydrazine precursors. The indole nitrogen can then be alkylated. Deprotonation followed by reaction with dichlorodimethylsilane (or cyclotetramethylene-dichlorosilane) conveniently attaches silicon at the indenyl methylene. Reaction of the monochlorosilane with a cyclopentadienyl or indenoindolyl anion provides the desired bridged ligand precursor. Double deprotonation and combination of the resulting dianion with a zirconium source affords the ultimate target, a silyl-bridged indeno[1,2-b]indolyl zirconium complex.

An activator is used in the polymerization. The activator helps to ionize the zirconium complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutylaluminum), and the like. Suitable activators include salts that contain non-nucleophilic anions. These compounds generally consist of bulky ligands attached to boron or aluminum. Examples include lithium tetrakis(penta-fluorophenyl)borate, lithium tetrakis(pentafluorophenyl)aluminate, anilinium tetrakis(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241, 025, the teachings of which are incorporated herein by reference. Suitable activators also include aluminoboronates—reaction products of alkyl aluminum compounds and organoboronic acids—as described in U.S. Pat. Nos. 5,414, 180 and 5,648,440, the teachings of which are incorporated herein by reference. Alumoxane activators, such as MAO, are preferred.

The optimum amount of activator needed relative to the amount of zirconium complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of zirconium. When the activator is an organoborane or an ionic borate or aluminate, the amount used will be within the range of about 0.01 to about 5000 moles, preferably from about 0.1 to about 10 moles, of activator per mole of zirconium.

The catalyst comprises a supported zirconium complex. The support is preferably a porous material such as inorganic oxides and chlorides, and organic polymer resins. Preferred inorganic oxides include oxides of Group 2, 3, 4, 5, 13, or 14 elements. Preferred supports include silicas, aluminas, silica-aluminas, magnesias, titanias, zirconias, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of complex added is preferably from 0.01 to 0.5 mmol per gram of support.

In one suitable catalyst preparation method, a solution of the complex is combined with the support. The mixture is stirred in an inert atmosphere at a temperature within the range of 0° C. to 120° C., more preferably from 20° C. to 40° C. The optimum stirring time will vary somewhat, depending upon the amounts of solvent and support, but it should be long enough to ensure good mixing. Preferably, the stirring time is from 2 to 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. Alternatively, an incipient wetness technique can be used in which a small amount of solvent is used to dissolve the complex and the solution is added to the support material. The mixture remains a free-flowing solid without solvent removal. The mixture can be used as is or residual solvent may be removed.

Different methods for addition of the activator and for combining the complex with the support may be used. In one suitable method, the activator is premixed with the support and the complex is added to the mixture of support and activator. Optionally, the activator is combined with the complex and the mixture of activator and complex is added to the support. Alternatively, a portion of the activator is combined with the support and a mixture of the complex and the remaining amount of the activator is added to the support.

The slurry process produces polyethylene with good incorporation of the α-olefin. The amount of α-olefin incorporation will depend upon the particular α-olefin and the amount added to the polymerization. The level of α-olefin incorporation can be easily measured by FT-IR spectroscopy. Each molecule of α-olefin incorporated gives one tertiary carbon atom. "Good incorporation" of the α-olefin is indicated by a polyethylene density value that drops steadily upon increasing the content of α-olefin in the reaction mixture. More quantitatively, this generally means that when 63 mmoles of 1-butene per mole of ethylene is introduced into the liquid phase, the resulting polyethylene has more than 5 tertiary carbons per 1000 carbons.

The process produces polyethylene with moderate long-chain branching. As described in Macromolecules 39 (2006) 1474, rheological measurements can be used to estimate the amount of long-chain branching. At low shear rates, the viscosity of polyethylene with long-chain branching is higher than the viscosity of linear polyethylene of equivalent molecular weight. We can use a viscosity enhancement factor (VEF) as an indication of long-chain branching. The viscosity enhancement factor can be determined from the ratio of the measured viscosity at a fixed temperature and frequency to the viscosity predicted for linear polyethylene of equivalent molecular weight. Preferably, the temperature used is 190° C. and the frequency is 0.025 rad/s. For the purpose of this application, by "viscosity enhancement factor" we mean the ratio of the measured viscosity at 190° C. and a frequency of 0.025 rad/s to the viscosity predicted for linear polyethylene of equivalent molecular weight. The viscosities of more than forty linear polyethylene samples of varying weight-average molecular weight were measured to develop the relationship between $M_w$ and viscosity at 0.025 rad/s. The viscosity prediction for linear polyethylene $=(2.1\times10^{-14})(M_w^{3.66})$. A linear polyethylene will have a viscosity enhancement factor of about 1, while a sample of polyethylene known to have substantial long-chain branching had a viscosity enhancement factor of 15. By "moderate long-chain branching," we mean a viscosity enhancement factor between 2.0 and 4.0. Such polyethylenes are mostly linear, and the rheological effect of the long-chain branching is relatively small. For more details about how to measure and compute VEF, see copending application Ser. No. 11/897,438, filed Aug. 29, 2007, the teachings of which are incorporated herein by reference.

The process uses a highly active catalyst. A convenient measure of activity is the amount of polyethylene formed per hour per gram of zirconium used. Because factors such as temperature or time can influence the measured activity, it is convenient to compare measured activities with those obtained by using a known complex under similar polymerization conditions. One such readily available complex is bis(cyclopentadienyl)zirconium dichloride.

As defined herein, "activity ratio" means the value of $A_1/A_2$, where $A_1$ is the activity (grams of polymer per gram of Zr per hour) of a complex of interest that is supported and activated as described in Example 1 and is then used for a slurry polymerization in the presence of 1-butene and hydrogen as described in Example 1; and $A_2$ is the activity of bis(cyclopentadienyl)zirconium dichloride that is supported and activated as described in Example 1 and is then used for a slurry polymerization as described in Example 1 except that 1-butene and hydrogen are omitted from the slurry polymerization.

Thus, the baseline experiment with $Cp_2ZrCl_2$ is an ethylene homopolymerization performed in the absence of hydrogen. Catalysts useful in the slurry process of the invention have an activity ratio as defined herein greater than 2, preferably greater than 3.

The inventive slurry process provides polyethylene having a weight-average molecular weight greater than 250,000, preferably greater than 350,000 and most preferably greater than 500,000. Too often, a process is unable to provide polyethylene with high enough molecular weight (or low enough melt index), and this limits its usefulness. The inventive process provides the desirable high molecular weight.

Preferably, the inventive slurry process has good hydrogen sensitivity and even low levels of hydrogen reduce the molecular weight. Increased levels of hydrogen further reduce the molecular weight. The hydrogen sensitivity can be judged by comparing polymerizations with and without added hydrogen. By "good hydrogen sensitivity," we mean that introduction of 0.82 mmoles of hydrogen per 1 mole of ethylene into the liquid phase reduces the weight-average molecular weight by at least 60%.

Complex concentrations used for the olefin polymerization depend on many factors. Preferably, however, the concentration ranges from about 0.01 micromoles zirconium per liter to about 100 micromoles per liter. Olefin partial pressures normally range from about 0.1 MPa to about 350 MPa. More preferred is the range from about 0.1 MPa to about 7 MPa. Polymerization times depend on the type of process, the complex concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

A 1-L flask equipped with a stir bar is charged with 8-methyl-5-phenyl-5,10-dihydroindeno[1,2-b]indole (20.8 g, 70.4 mmol) and diethyl ether (200 mL). The flask is equipped with a straight-tip gas inlet adapter, rubber septum, and reflux condenser. A solution of n-butyllithium (32.0 mL, 2.5 M in hexanes, 80 mmol) is added. Neat dichlorodimethylsilane (4.3 mL, 35.5 mmol) is added and a precipitate forms. The mixture is stirred for three days, filtered, and volatiles removed from the filtrate to obtain an oily residue (8.87 g).

The oily residue (8.87 g, 13.7 mmol) is slurried in 180 mL of diethyl ether and n-butyllithium (12.0 mL, 2.5 M in hexanes, 30.0 mmol) is added by syringe to the slurry. The mixture is maintained at room temperature overnight and is added to a slurry of zirconium tetrachloride (3.16 g, 13.2 mmol) in methylene chloride (100 mL) and diethyl ether (50 mL) to give a dark red slurry. The mixture is stirred for 3 days. The mixture is filtered and dried to obtain a purple solid, 1,1-dimethylsilyl-bis(5,10-dihydrido-8-methyl-5-phenyl-indeno[1,2-b]indolyl)zirconium dichloride 1 (1.61 g).

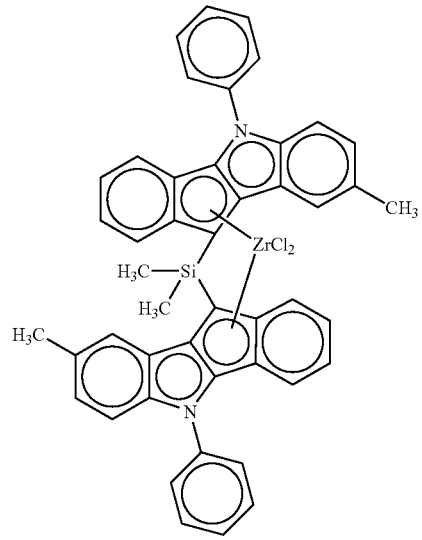

Support and Activation of Complex 1: Methylalumoxane (2.2 mL of 4.21 M solution in toluene, available from Albemarle Corporation) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of dry complex 1 (Al/Zr=100) is added to the slurry and stirred for 2 hours at ambient temperature. An aliquot of this catalyst slurry is used while fresh (1 to 3 days) in polymerization tests.

Slurry Polymerization with Supported Complex 1: Isobutane (1 L), 1-butene (5 mL) and 1M triisobutylaluminum solution in hexanes (1 mL) is added to a dry, nitrogen-purged stainless-steel stirred and jacketed autoclave reactor. The reactor is heated to 70° C. and pressurized to 1.7 MPa with ethylene. The polymerization reaction is started by injecting an aliquot of catalyst sample. The temperature is maintained at 70° C. throughout the test. The ethylene is supplied on demand to maintain the reactor pressure of 1.7 MPa. The polymerization is terminated by venting the autoclave after consumption of about 20 g of ethylene. The polyethylene sample is dried and tested.

The viscosity enhancement factor (VEF) is determined to be 2.71. By GPC, the polyethylene has a weight-average molecular weight ($M_w$) of 702,000 and a $M_w/M_n$ of 2.41. Branching is determined by FT-IR spectroscopy to be 6.03 tertiary carbons per 1000 carbons. The activity ratio, computed as discussed hereinabove, is 4.84. When the slurry polymerization is repeated using hydrogen added from a 7 mL vessel at 4.1 MPa to effect a pressure drop of 0.7 MPa (calculated to be 0.82 mmole hydrogen per mole of ethylene), the $M_w$ is reduced by 68%.

EXAMPLE 2

5,10-Dihydro-5,8-dimethylindeno[1,2-b]indole (15.8 g, 67.7 mmol) is taken up in diethyl ether (250 mL), and n-butyllithium (30.0 mL, 2.5 M in hexanes, 75.0 mmol) is added dropwise at room temperature to afford a dark orange solution. The mixture is maintained overnight and added dropwise to a solution of cyclotetramethylenedichlorosilane (50.0 g, 322 mmol) in diethyl ether (200 mL). The mixture turns purple, and a precipitate forms. The mixture is stirred for 3 days and is filtered through Celite. The volatiles are removed under reduced pressure to afford a solid. The solid is washed with hexanes (200 mL) to yield a gray solid which is dried under vacuum (7.26 g, 30.5%).

The dried, gray solid (7.22 g, 20.5 mmol) is dissolved in diethyl ether (180 mL), and sodium cyclopentadienide (11.3 mL, 2.0 M in tetrahydrofuran 22.6 mmol) is added by syringe at room temperature. A precipitate forms immediately, and the mixture is maintained overnight. The crude slurry is filtered through Celite, and the filtrate is concentrated under vacuum to afford a solid (4.16 g, 53%). The solid is taken up in diethyl ether (150 mL) and n-butyllithium (10.0 mL, 2.5 M, 25.0 mmol) is added by syringe at room temperature. The mixture turns orange, and a precipitate forms after 3 hours. The mixture is stirred overnight and filtered to obtain a solid dilithium salt which is dried under vacuum (5.66 g, 99%).

Zirconium tetrachloride (1.44 g, 6.17 mmol) is suspended in methylene chloride (80 mL) and diethyl ether (50 mL) is added to give a clear solution. The dilithium salt (2.43 g, 6.17 mmol) is added as a solid with stirring, and the mixture turns red. The stirring is maintained for three days and the slurry is filtered. The residue is extracted with methylene chloride (70 mL), filtered, and the filtrate concentrated to about 40 mL. A precipitate forms and is filtered to yield a red solid (0.49 g), complex 2.

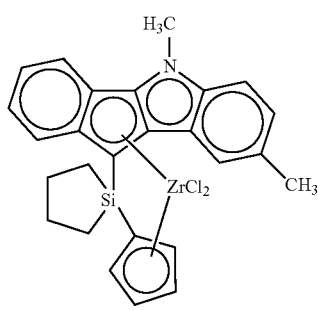

The complex is supported and used in a slurry polymerization in similar fashion as in Example 1. The results are reported in Table 1.

EXAMPLE 3

Complex 3 is prepared in similar fashion as complexes 1 and 2.

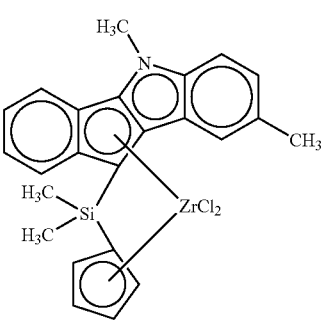

The complex is supported and used in a slurry polymerization in similar fashion as in Example 1. The results are reported in Table 1.

EXAMPLE 4

Complex 4 is prepared in similar fashion as complexes 1 and 2.

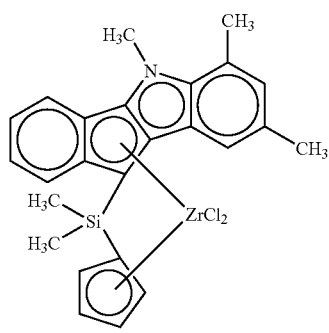

The complex is supported and used in a slurry polymerization in similar fashion as in Example 1. The results are reported in Table 1.

EXAMPLE 5

Complex 5 is prepared in similar fashion as complexes 1 and 2.

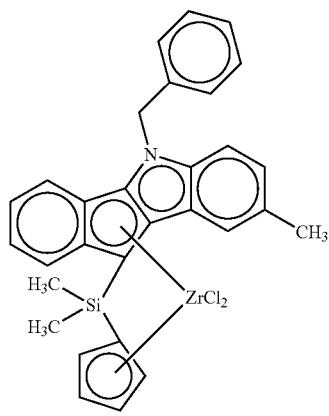

The complex is supported and used in a slurry polymerization in similar fashion as in Example 1. The results are reported in Table 1.

EXAMPLE 6

Complex 6 is prepared in similar fashion as complexes 1 and 2.

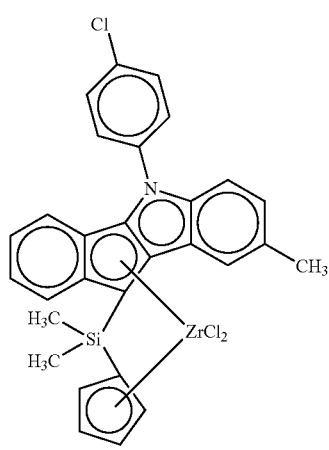

The complex is supported and used in a slurry polymerization in similar fashion as in Example 1. The results are reported in Table 1.

COMPARATIVE EXAMPLES 7-23

Complexes 7-11 and 13-23 are prepared in similar fashion as complexes 1 and 2 except that $CH_2$-bridged complex 8 is prepared as in U.S. Pat. No. 7,196,147 (see column 6). Complex 12 is purchased from Sigma-Aldrich, Inc. Each complex is supported and used in a slurry polymerization in similar fashion as in Example 1. The results are reported in Table 1.

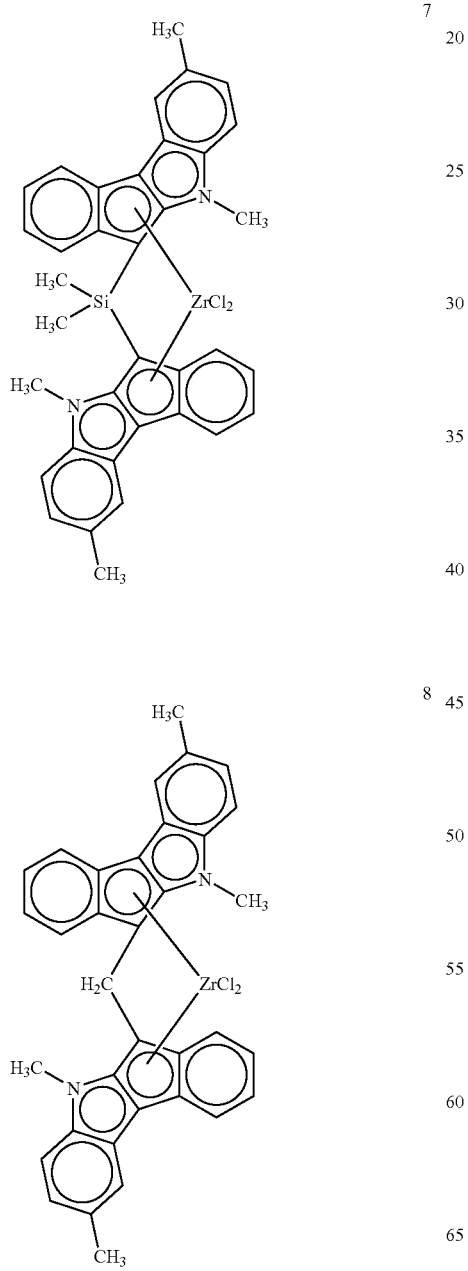

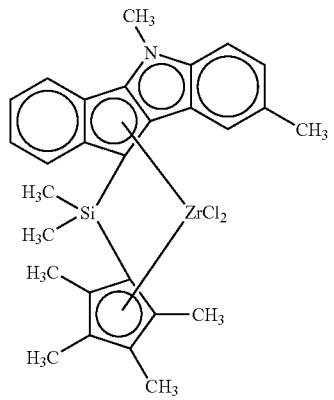

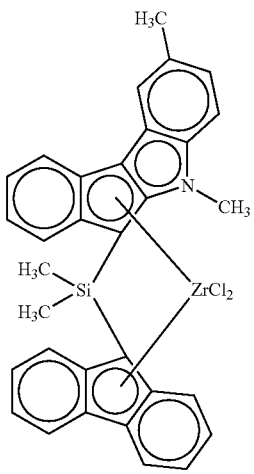

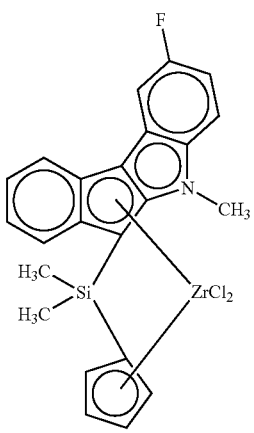

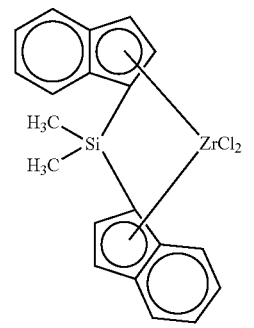

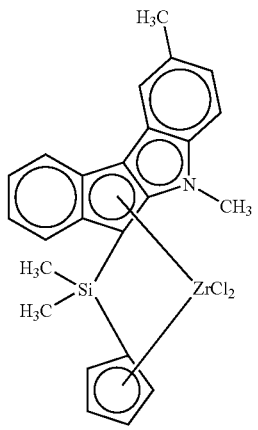
13
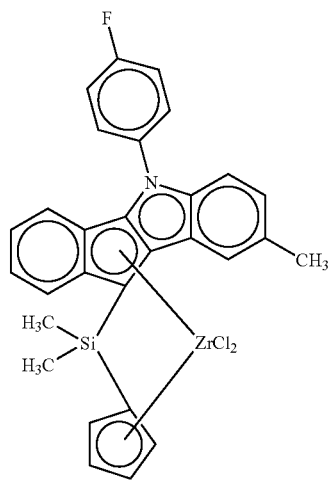
16
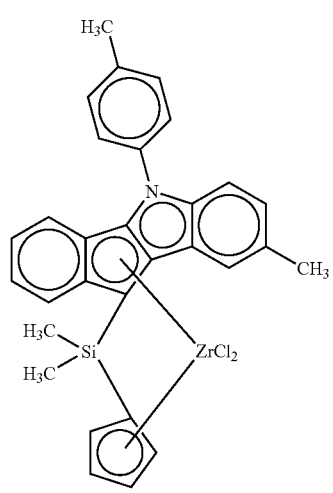
14
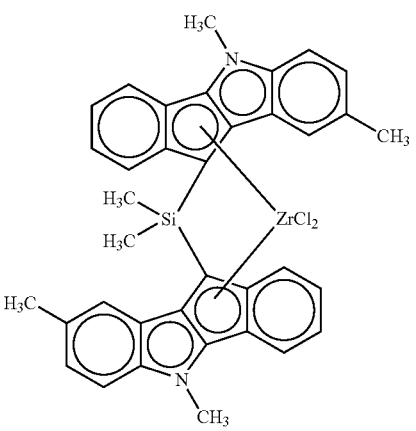
17
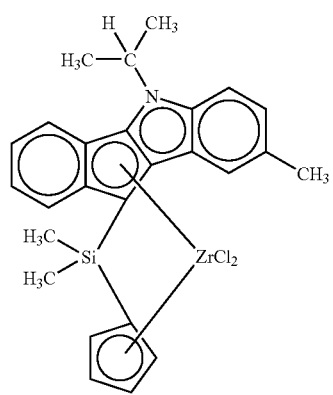
15
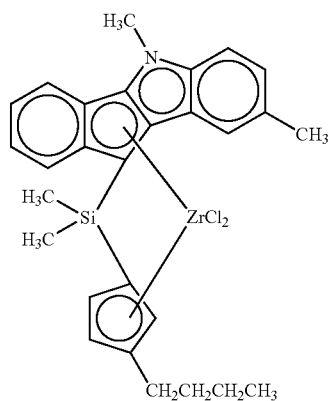
18

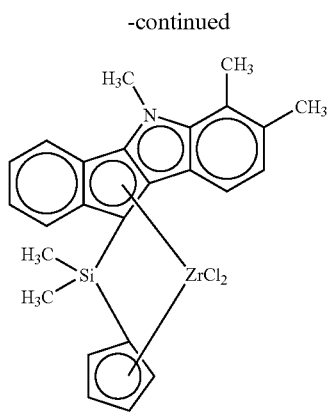

19

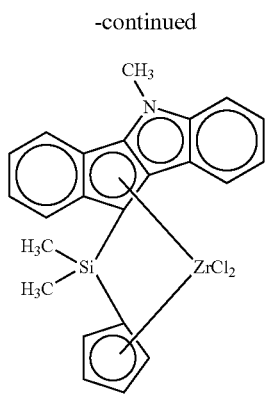

23

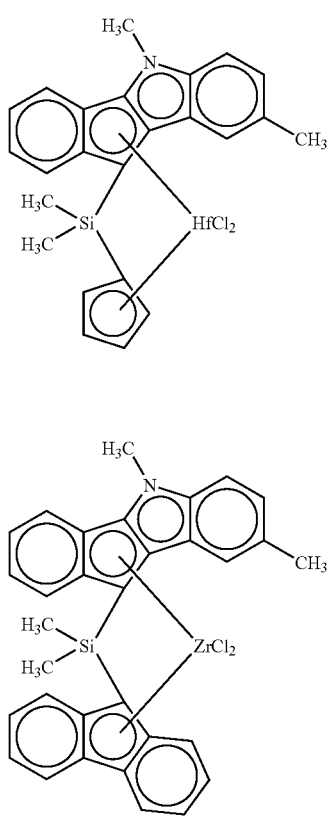

20

21

22

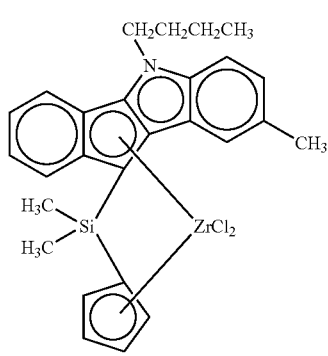

TABLE 1

Polymerizations

| Example | VEF | $M_w$ | $M_w$ reduction with $H_2$ | $M_w/M_n$ | Tertiary C/ 1000 C | Activity Ratio |
|---|---|---|---|---|---|---|
| 1 | 2.71 | 702,000 | 68% | 2.41 | 6.03 | 4.84 |
| 2 | 2.50 | 535,000 | 88% | 4.21 | 6.83 | 3.03 |
| 3 | 2.99 | 517,000 | 90% | 4.13 | 6.33 | 2.69 |
| 4 | 2.34 | 784,000 | 94% | 4.97 | 5.45 | 3.49 |
| 5 | 2.67 | 397,000 | 85% | 3.40 | 5.40 | 3.01 |
| 6 | 2.27 | 502,000 | 89% | 3.65 | 5.88 | 2.32 |
| C7 | 10.04 | 273,000 | 64% | 3.13 | 8.70 | 7.16 |
| C8 | 10.70 | 250,000 | 52% | 4.12 | 20.7 | 5.51 |
| C9 | 5.63 | 372,000 | 77% | 2.29 | 4.97 | 2.36 |
| C10 | 5.40 | 344,000 | 6% | 2.65 | 5.53 | 2.11 |
| C11 | 4.65 | 236,000 | 83% | 3.98 | 8.53 | 3.45 |
| C12 | 4.61 | 257,000 | 66% | 5.10 | 12.2 | 6.87 |
| C13 | 4.40 | 198,000 | 81% | 3.21 | 8.47 | 3.74 |
| C14 | 3.61 | 507,000 | 64% | 5.57 | 6.10 | 1.63 |
| C15 | 3.60 | 316,000 | 86% | 5.85 | 7.17 | 1.38 |
| C16 | 2.96 | 552,000 | 90% | 5.16 | 6.68 | 1.04 |
| C17 | 1.94 | 1,000,000 | 86% | 4.26 | 5.77 | 6.02 |
| C18 | 1.60 | 289,000 | 75% | 3.96 | 7.27 | 4.98 |
| C19 | 1.53 | 522,000 | 90% | 4.69 | 7.50 | 1.47 |
| C20 | 2.13 | 347,000 | 39% | 2.92 | 9.65 | 0.10 |
| C21 | 1.44 | 753,000 | 43% | 2.31 | 5.35 | 1.88 |
| C22 | 0.99 | 415,000 | 86% | 3.17 | 8.13 | 1.08 |
| C23 | 0.88 | 543,000 | 89% | 3.73 | 5.47 | 1.61 |

As can be seen from Table 1, the claimed slurry process (Examples 1-6) produce polyethylene with all four desired features, namely good incorporation of the α-olefin as evidenced by greater than 5 tertiary carbons per 1000 carbons; capable of forming polyethylene having a high weight-average molecular weight, as evidenced by $M_w$>250,000; moderate long-chain branching, as evidenced by a VEF from 2.0 to 4.0, and good activity as evidenced by an activity ratio of greater than 2.

As can be seen by Comparative Examples 7-23, this is unexpected. Very similar complexes fail to provide all four desired features.

Further, the process exhibits good hydrogen sensitivity as evidenced by a greater than 60% reduction in $M_w$ upon introduction into the liquid phase of 0.82 mmoles of hydrogen per mole of ethylene.

The preceding examples are meant only as illustrations. The following claims define the invention.

We claim:
1. A slurry process which comprises polymerizing ethylene at a temperature within the range of about 40° C. to about 90° C. in the presence of a $C_3$-$C_{10}$ α-olefin and a catalyst comprising an activator and a supported complex to produce polyethylene with good incorporation of the α-olefin and moderate long-chain branching as indicated by a viscosity enhancement factor between 2.0 and 4.0; wherein the process provides polyethylene having weight-average molecular weight greater than 250,000; wherein the catalyst has an activity ratio as defined herein greater than 2; and wherein the complex has a structure selected from the group consisting of:

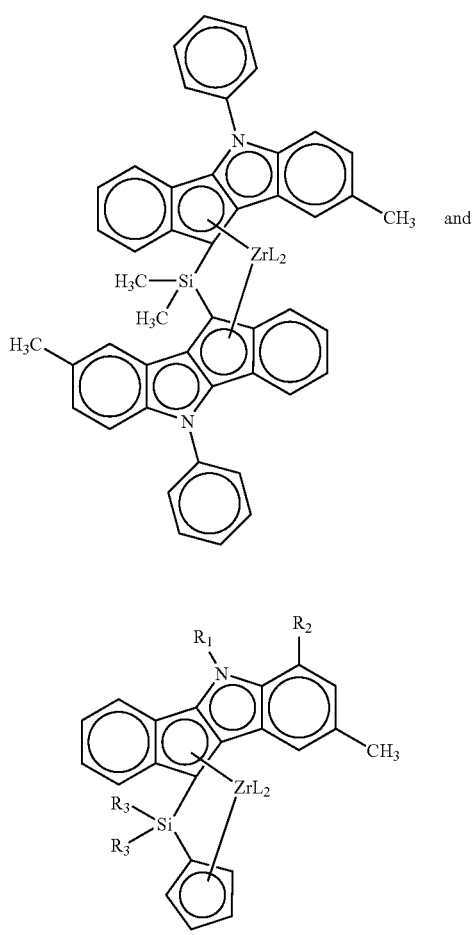

wherein $R_1$ is selected from the group consisting of methyl, benzyl, and p-chlorophenyl; $R_2$ is selected from the group consisting of methyl and hydrogen; each $R_3$ is methyl or both taken together are tetramethylene and each L is independently selected from the group consisting of halide, alkoxy, aryloxy, siloxy, alkylamino, and $C_1$-$C_{30}$ hydrocarbyl.

2. The process of claim 1 wherein the activator is selected from the group consisting of alumoxanes, alkylaluminum compounds, organoboranes, ionic borates, ionic aluminates, aluminoboronates, and combinations thereof.

3. The process of claim 2 wherein the activator is methylalumoxane.

4. The process of claim 1 wherein each L is Cl.

5. The process of claim 1 wherein the $C_3$-$C_{10}$ α-olefin is selected from the group consisting of propylene, 1-butene, 1-hexene, 1-octene, and combinations thereof.

6. The process of claim 1 wherein 63 mmoles of 1-butene per mole of ethylene forms polyethylene with greater than 5 tertiary carbons per 1000 carbons.

7. The process of claim 1 wherein the supported complex is supported on silica.

8. The process of claim 1 wherein the polyethylene has a weight-average molecular weight greater than 350,000.

9. The process of claim 1 wherein the process has good hydrogen sensitivity such that introduction of 0.82 mmoles of hydrogen per mole of ethylene reduces the weight-average molecular weight by at least 60%.

10. The process of claim 1 wherein the complex has the structure:

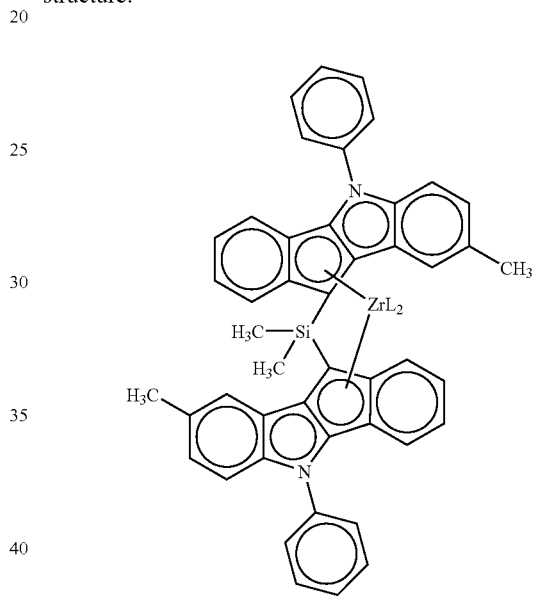

in which each L is independently selected from the group consisting of halide, alkoxy, aryloxy, siloxy, alkylamino, and $C_1$-$C_{30}$ hydrocarbyl.

11. The process of claim 1 wherein the complex has the structure:

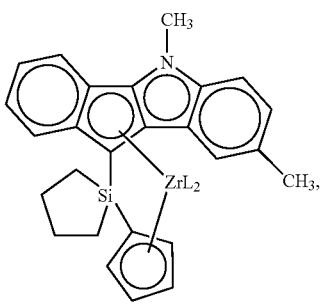

in which each L is independently selected from the group consisting of halide, alkoxy, aryloxy, siloxy, alkylamino, and $C_1$-$C_{30}$ hydrocarbyl.

12. The process of claim 1 wherein the complex has the structure:

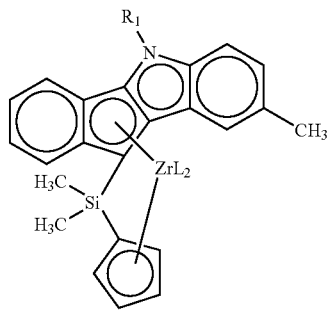

in which $R_1$ is selected from the group consisting of methyl, benzyl, and p-chlorophenyl; and each L is independently selected from the group consisting of halide, alkoxy, aryloxy, siloxy, alkylamino, and $C_1$-$C_{30}$ hydrocarbyl.

13. The process of claim 1 wherein the complex has the structure:

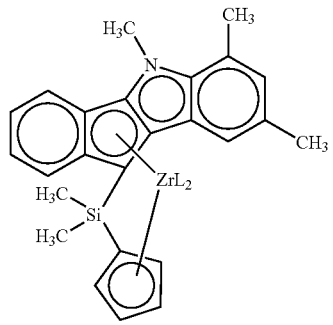

in which each L is independently selected from the group consisting of halide, alkoxy, aryloxy, siloxy, alkylamino, and $C_1$-$C_{30}$ hydrocarbyl.

* * * * *